(12) United States Patent
Bruce

(10) Patent No.: US 8,850,655 B2
(45) Date of Patent: Oct. 7, 2014

(54) BRONZE BUSHING AND WEAR SURFACE

(75) Inventor: Robert William Bruce, Loveland, OH (US)

(73) Assignee: General Electric Company, Schenectady, NY (US)

( * ) Notice: Subject to any disclaimer, the term of this patent is extended or adjusted under 35 U.S.C. 154(b) by 131 days.

(21) Appl. No.: 13/407,286

(22) Filed: Feb. 28, 2012

(65) Prior Publication Data
US 2013/0219656 A1    Aug. 29, 2013

(51) Int. Cl.
*F16L 5/00*    (2006.01)

(52) U.S. Cl.
USPC .............................. 16/2.1; 384/625; 384/907

(58) Field of Classification Search
USPC ....... 16/2.1–2.5; 419/2, 27; 508/100; 384/13, 384/625, 902, 907
See application file for complete search history.

(56) References Cited

U.S. PATENT DOCUMENTS

| | | | |
|---|---|---|---|
| 2,608,403 A * | 8/1952 | Luther | 188/322.19 |
| 3,431,203 A * | 3/1969 | Schleede et al. | 508/100 |
| 3,879,301 A * | 4/1975 | Cairns | 508/104 |
| 3,909,087 A * | 9/1975 | Cairns | 384/293 |
| 3,994,815 A * | 11/1976 | Coleman | 508/591 |
| 4,034,922 A | 7/1977 | Coxhill | |
| 4,216,846 A | 8/1980 | Wheeler | |
| 4,351,383 A | 9/1982 | Gladwin | |
| 4,777,781 A | 10/1988 | Doster et al. | |
| 4,821,414 A | 4/1989 | Ducret | |
| 4,826,396 A | 5/1989 | Blount | |
| 4,991,864 A | 2/1991 | Potsch | |
| 5,094,548 A * | 3/1992 | Danly, Sr. | 384/30 |
| 5,350,339 A | 9/1994 | Carmichael | |
| 5,394,680 A | 3/1995 | Sheldon, Jr. et al. | |
| 5,394,937 A | 3/1995 | Nieh | |
| 5,413,756 A | 5/1995 | Sahu | |
| 5,549,394 A * | 8/1996 | Nowak et al. | 384/282 |
| 5,556,207 A | 9/1996 | Daniel | |
| 5,795,198 A | 8/1998 | Pedone | |
| 5,819,952 A | 10/1998 | Cook et al. | |
| 6,029,790 A | 2/2000 | Liu et al. | |

(Continued)

FOREIGN PATENT DOCUMENTS

| | | |
|---|---|---|
| CA | 2670200 A1 | 11/2008 |
| DE | 102010018328 A1 | 10/2011 |
| GB | 920785 A | 3/1963 |
| WO | 2011134981 A1 | 11/2011 |

OTHER PUBLICATIONS

Search Report and Written Opinion from corresponding PCT Application No. PCT/US2013/026281, dated May 17, 2013.

(Continued)

*Primary Examiner* — William Miller
(74) *Attorney, Agent, or Firm* — General Electric Company; James E. Cole

(57) ABSTRACT

A bushing includes a bronze backing layer having a first axial end, a second axial end, and a central opening, the bushing having a cylindrical shape and a porous bronze layer. PTFE or other suitable low friction material is impregnated into the porous bronze layer at one of a radially inner or outer surface of the bushing. A PTFE or other suitable low friction material topical layer is disposed adjacent the impregnated layer. The bushing may optionally comprise a flange which also includes the bronze backing layer, the porous bronze and impregnated layer, and the topical layer on an axially inner or outer surface.

22 Claims, 4 Drawing Sheets

(56) References Cited

U.S. PATENT DOCUMENTS

| | | | |
|---|---|---|---|
| 6,042,778 A | 3/2000 | Kraft | |
| 6,286,837 B1 | 9/2001 | Humphrey | |
| 6,579,492 B2 | 6/2003 | Wehler | |
| 6,979,129 B2 * | 12/2005 | Farbaniec et al. | 384/297 |
| 7,690,590 B2 | 4/2010 | Nelson et al. | |
| 2003/0213671 A1 * | 11/2003 | DePiazza et al. | 192/98 |
| 2007/0164151 A1 | 7/2007 | Luce | |
| 2008/0226933 A1 * | 9/2008 | Bickle et al. | 428/545 |
| 2012/0141052 A1 * | 6/2012 | Drew et al. | 384/13 |

OTHER PUBLICATIONS

ASM International: "ASM Specialty Handbook; Copper and Copper alloys, Passage", Aug. 1, 2001, p. 1, XP002317828.

* cited by examiner

BRONZE BUSHING AND WEAR SURFACE

BACKGROUND

The disclosed embodiments generally pertain to a bushing. More specifically disclosed embodiments pertain to a bronze alloy bushing having an impregnated polymer and topical polymer layers.

SUMMARY

A bushing comprises a bronze backing layer having a first axial end, a second axial end, and a central opening, the bushing having a cylindrical shape and a porous bronze layer. A polymer, such as PTFE or other suitable low friction material is impregnated into the porous bronze layer at one of a radially inner or outer surface of the bushing. A polymer topical layer such as PTFE or other suitable low friction material is disposed adjacent the impregnated polymer layer. The bushing may optionally comprise a flange which also includes the bronze backing layer, the porous bronze and impregnated polymer, and the polymer topical layer on an axially inner or outer surface. The flange allows for use of load bearing in the axial direction while the bushing receives radial loads.

It would be desirable to develop a bushing having decreasing friction, increasing load bearing capacity, increasing life of the bushing and which may replace existing bushing structures having friction, wear or strength issues.

All of the above outlined features are to be understood as exemplary only and many more features and objectives of the invention may be gleaned from the disclosure herein. Therefore, no limiting interpretation of this summary is to be understood without further reading of the entire specification, claims, and drawings included herewith.

BRIEF DESCRIPTION OF THE ILLUSTRATIONS

The above-mentioned and other features and advantages of this invention, and the manner of attaining them, will become more apparent and the bushing will be better understood by reference to the following description of embodiments taken in conjunction with the accompanying drawings, wherein.

DETAILED DESCRIPTION

Referring initially to FIGS. 1-6, various embodiments of a PTFE impregnated bronze bushing are depicted which allow for increased yield strength and improved results in wear testing at elevated temperature and high load actuating processes. The bushing structures may be formed with wear areas in both the axially and radially oriented surfaces.

Figure 1:
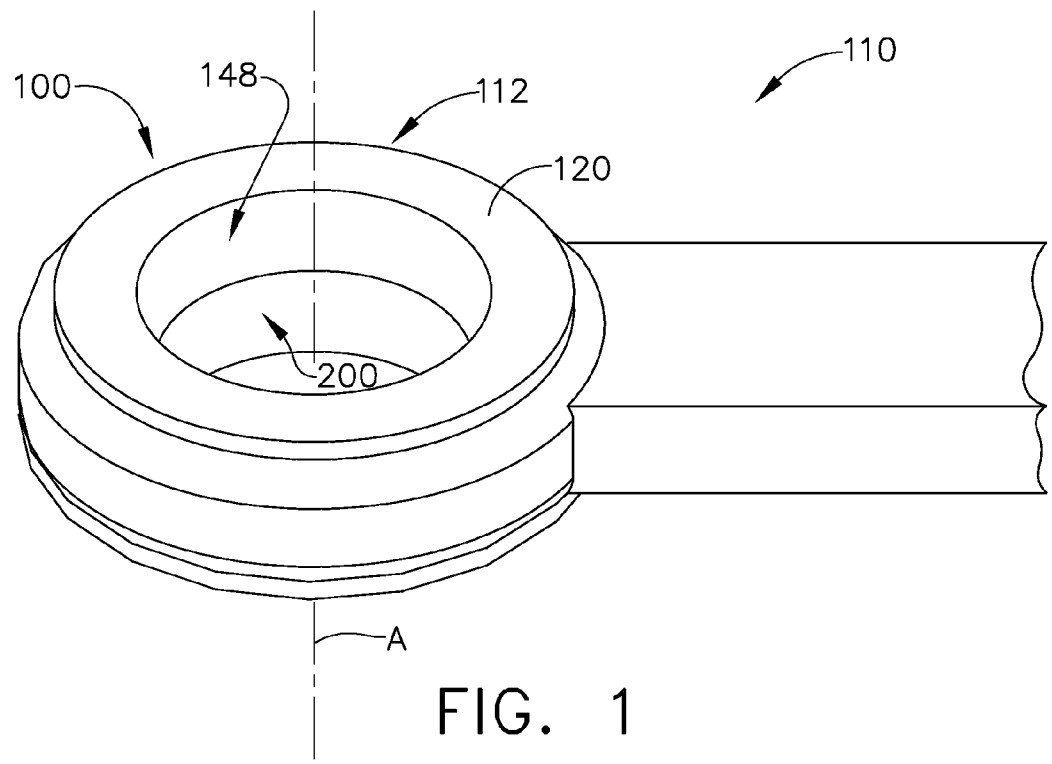
FIG. 1 is a perspective view of one embodiment a bronze bushing and wear area positioned in an actuator arm.

Referring now to FIG. 1, a bushing 100 is shown in perspective view positioned within a joint 112 of an exemplary actuator 110. The actuator 110 is a rod-like structure which moves allowing pivoting at the joint 112 and receives force loading at the joint 112. This is merely exemplary for purpose of describing one use of the bushing 100 but others uses are contemplated and should be considered within the scope of the instant teaching. The bushing 100 provides improved wear and loading characteristics over polymeric bushings by having increased yield strength while still maintaining a light weight. This is highly desirable in various application fields including, but not limited to, the aviation industry. The bushing 100 has a yield strength of at least 30 ksi and more preferably may have a yield strength of 50 ksi. Most preferably the bushing 100 may have a yield strength of at least 100 ksi. As will be understood further, according to one embodiment the bushing 100 includes a wear area for radially inward, outward or both surfaces and may have axially inward, outward or both wear surfaces as well.

According to one embodiment, the bushing 100 may also comprise a flange 120 at an axial end of the bushing 100. The flange 120 is positioned against one side of an opening of the joint 112. The flanges 120, 220 provide a surface to withstand axial load bearing and wear resistance. At a bottom side of the joint 112 is a second bushing 200. Although two bushings are shown, it should be understood that a single bushing may be formed to extend throughout the entire joint 112. Additionally, the one or more bushings 100, 200 may alternatively be formed without the flanges 120, 220.

In one exemplary embodiment, the bushings 100, 200 are symmetrical about a major axis A, meaning that the bushings 100, 200 are not split or cut along the direction of axis A. The non-split bushing is formed in a stamping or press-based process according to one embodiment. In one alternative the bushings 100, 200 may be formed in a casting process or otherwise molded. However, in alternative embodiments, the bushing may be split, as is the case in roll-forming or other processes. Thus, although one embodiment is shown as being unsplit in the axial direction, such structure should not be considered limiting unless claimed explicitly.

The bushings 100, 200 of one embodiment are based upon bronze alloy material. The bronze alloy may be of a type known as C63020 or C63000 and may additionally be lead-free for purpose of environmental safety and health. Alternatively, if the bushing is cast, the bronze alloy may be a C95510.

Figure 2:
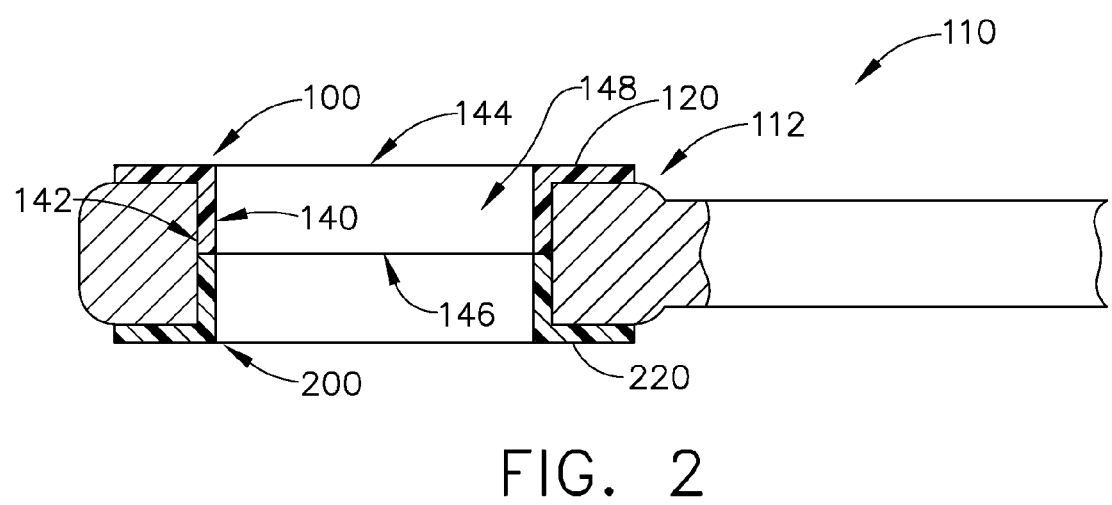
FIG. 2 is a sectional view of one embodiment of a bronze bushing and actuator arm of FIG. 1.

Referring now to FIG. 2, a side section view of the bushings 100, 200 are shown within the actuator joint 112. From this view, the flange structures 120, 220 are clearly shown. The flanges 120, 220 are formed in part during the manufacturing of this bushing 100, 200 where a sheet material is held during stamping to form the cylindrical portion of the bushing. The stamping process allows for the non-split design previously discussed. The flanges 120, 220 are a remaining portion of the sheet from which the bushings 100, 200 are formed. The flanges 120, 220 are not a necessary component and may be removed during the manufacturing process, by cutting or grinding, for example. However, in the instant embodiment of the actuator 110, the flanges 120 are utilized in order to receive axial loading and provide axial wear surfaces for the joint 112.

The bushing 100 is also shown with radially inner surface 140 and a radially outer surface 142. These surfaces of the bushing 100 extend from a first axial end 144 to a second axial end 146 and further comprise a central opening 148. The flange 120 may extend from either the first or second axial ends 144, 146.

Figure 3:
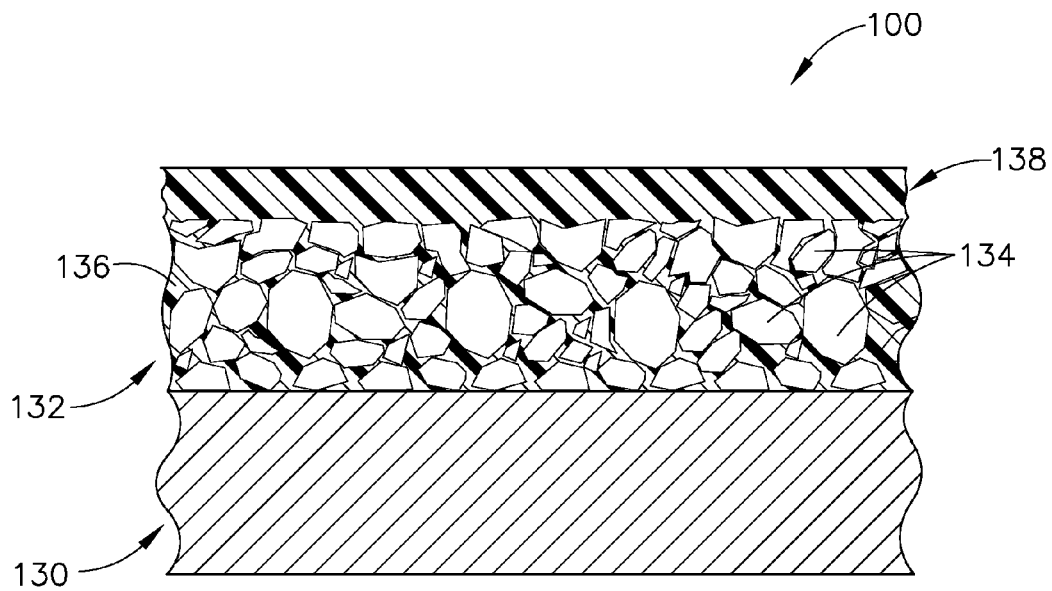
FIG. 3 is a detail sectional view of at least one exemplary bronze bushing and wear area on one radial side of the bushing.

Referring now to FIG. 3, a detailed section view of a portion of a bushing 100 is depicted at the radially outer layer of the structure is a bronze backing layer 130. The backing layer 130 is formed of a bronze C63020 or a C63000. Alternatively, if a cast part is formed, the bronze may be a C95510. As previously described, the alloy is desirably lead-free and has a thickness in the radial direction of about 29 mils. The bronze may further comprise about 5-15% aluminum and preferably about 10% aluminum. The alloy may also comprise about 1-10% aluminum. The alloy may also comprise about 1-10% iron and preferably 3% iron. The alloy additionally comprises 3-10% nickel and more preferably 5% nickel.

Above the bronze alloy backing layer 130 is an impregnated layer 132 comprising bronze and a low friction material. The impregnated layer 132 is formed of powdered bronze 134 which is sprinkled or positioned on the backing layer 130 and bonded, for example by sintering. This renders a porous bronze 134 which is subsequently impregnated with a low friction material 136, such as a polytetrafluoroethylene (PTFE). The PTFE is utilized for its exceptional resistance to elevated temperatures, chemical reactions, corrosion and stress grafting. The impregnated layer 132 has a thickness which is less than that of the backing layer 130 according to the depicted exemplary embodiment. Other low friction materials 136 may be utilized, for example polymerics such as polyethylene, polypropylene, poly-imide, PEEK may be utilized to impregnate the porous bronze layer 134. Additionally, the low friction material 136 may also include a solid lubricant such as finely dispersed molybdenum-disulfide, graphite or tungsten disulfide or liquid lubricants. As a further alternative, various polymerics may be combined such as PTFE and any of the other polymerics listed.

An upper or topical layer 138 extends above the impregnated layer 132. The topical layer 138 may include any of the above listed polymers or combination of the polymers as well as the solid of liquid lubricants. Although a line is shown separating the layers 132 and 138, the topical layer 138 may or may not be distinguishable from the layer 132. Such construction or distinction between the layers is not necessary. The topical layer 138 has a thickness which is less than that of the backing layer 130 and impregnated layer 132.

It is desirable that the wear of the bushing be decreased and that is achievable with the instant embodiment. The bushing 100 has wear of about 0.6 mil per million cycles at a load of 100 pounds. It is also desirable to limit wear of the bushing wear surfaces so that friction does not increase. The maximum measured coefficient of friction of the bushing 100 is about 0.13. Additionally, as previously mentioned, due to environmental safety and health issues, it is further desirable to use bronze alloys which are free of lead.

Figure 4:
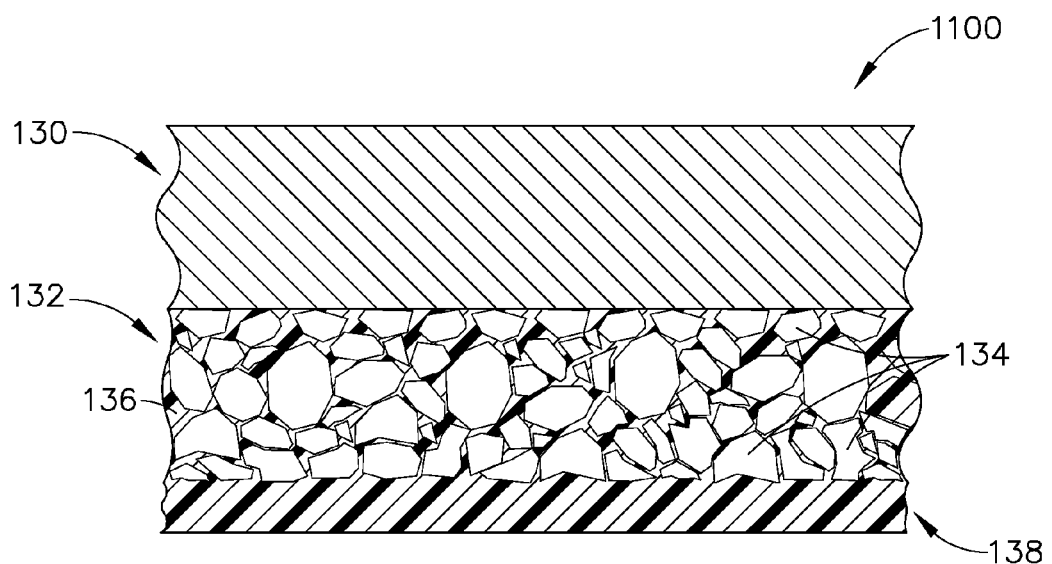
FIG. 4 is a detail sectional view of at least one exemplary bronze bushing and wear area on an opposite radial side of the bushing.

Referring now to FIG. 4, the structures are shown in the reverse order so that the backing layer 130 is on top. This is indicative of a bushing 1100 wherein the impregnated polymeric layer 132 and topical layer 138 are oriented radially inwardy rather than radially outwardly as in FIG. 3. Thus the bushing 100 may have PTFE or other polymeric on the radially innermost surface or alternatively the radially outermost surface. Additionally, the structure may include this impregnated polymeric layer on the flange 120 (FIGS. 1 and 2) either on the axially outward or axially inward side of the flange 120.

Figure 5:
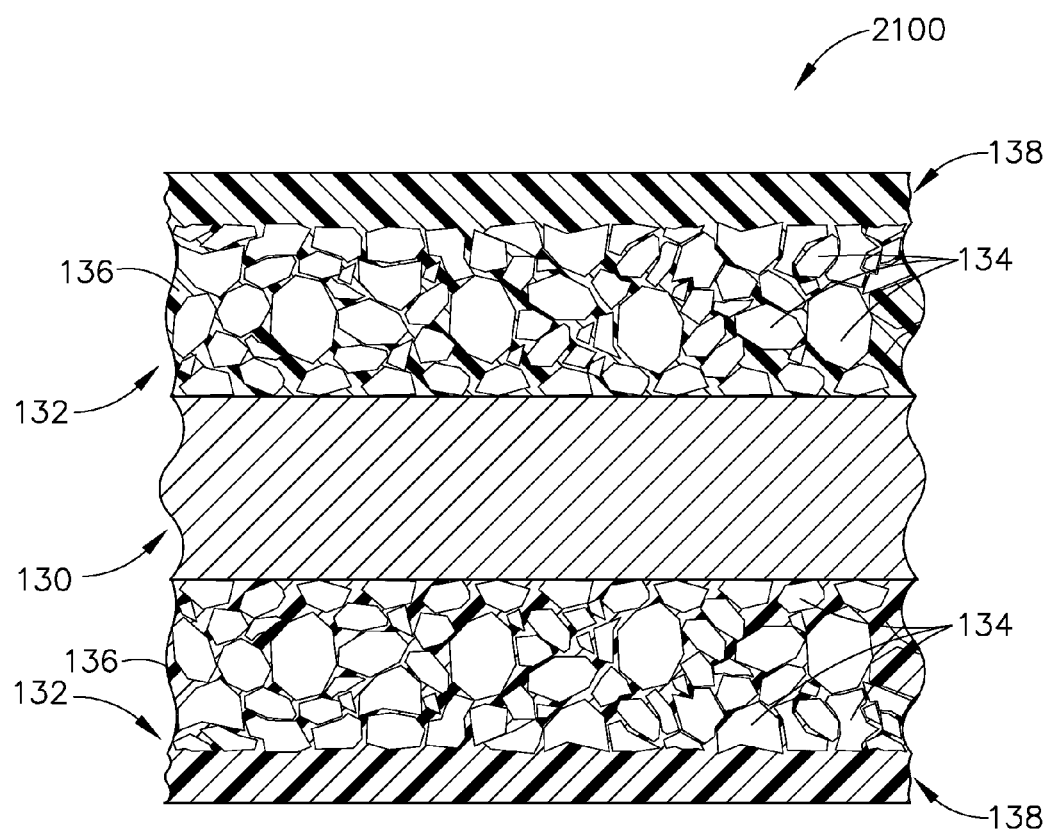
FIG. 5 is a detail sectional view of a further exemplary bronze bushing with wear areas on two sides of said bronze bushing.

Referring now to FIG. 5, a further alternative bushing 2100 is depicted wherein the bushing includes polymer layers 130 on both the radially inward and outward surfaces. Additionally, the impregnated polymer layer 132 and topical layer 138 may be located on both the radially inward and radially outward side of the bushing. Similarly, in embodiments where the flange 120 is used, the flange may have a polymer, such as PTFE, on both the axially inward and axially outward surface.

Figure 6:
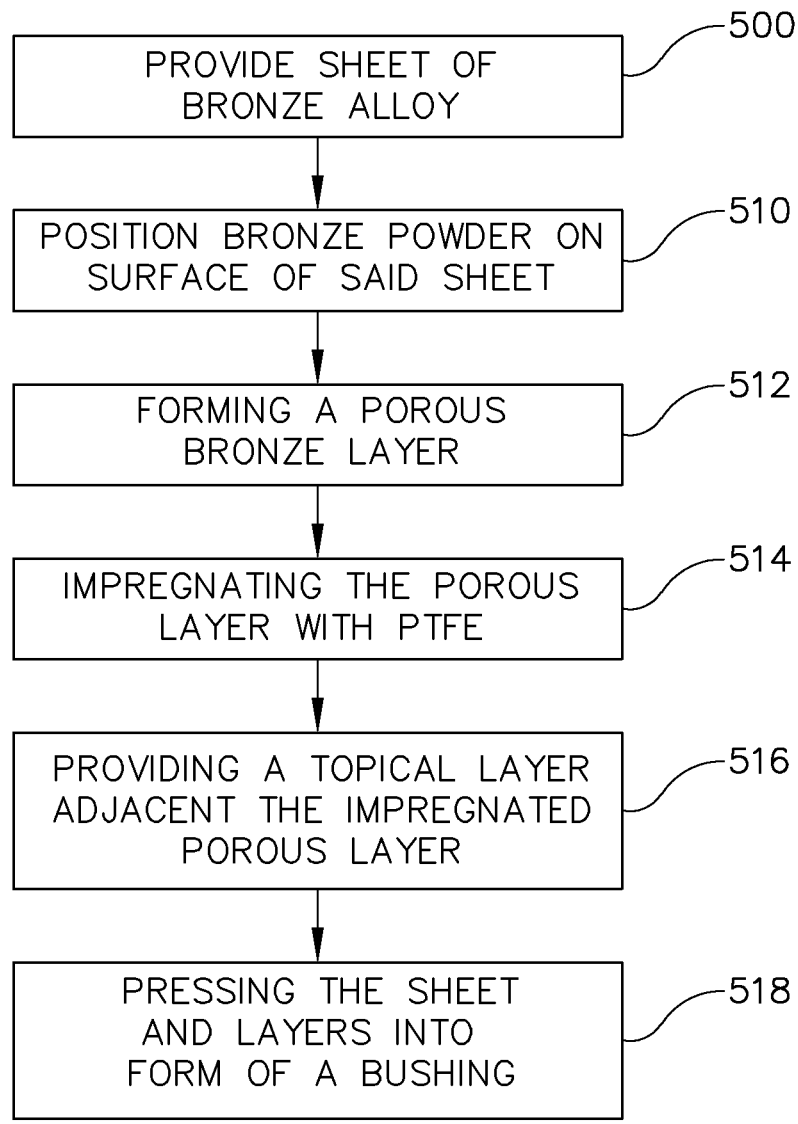
FIG. 6 is a flow chart setting forth at least one set of steps for forming an exemplary bronze bushing with wear area.

Referring now to FIG. 6 a flow chart depicts a method of forming the bronze bushing 100. First, at step 500 a sheet of bronze alloy 130 is provided and positioned to receive a bronze powder 134. Next, at step 510, the powder 134 is positioned on a surface of the bronze alloy sheet 130 and is bonded to the bronze alloy sheet. This bonding at step 512 may occur by sintering or other heating processes and creates a porous layer of bronze.

In the next step 514, polymeric is impregnated into the porous bronze layer. Although the FIG depicts the term PTFE, such usage is merely exemplary and other polymers may be utilized and therefore should not be considered limiting. The PTFE forms an integrated mix with the bronze powder and therefore the bronze backing layer. In step 516, a topical layer is distributed above the impregnated layer and this topical layer may be formed at the same time or separately to form a distinguishable or a non-distinguishable topical layer, relative to the impregnated layer.

Once the bronze alloy sheet is formed with the porous bronze, impregnated polymer and topical polymer layer, the bronze alloy sheet is pressed or stamped at step 518 to form the symmetrical bushing having the layers described. This process results in an unsplit bushing as previously described. Additionally, one skilled in the art should realize that the bronze alloy sheet may be formed with the layers on either or both surfaces of the formed bushing.

While multiple inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Examples are used to disclose the embodiments, including the best mode, and also to enable any person skilled in the art to practice the apparatus and/or method, including making and using any devices or systems and performing any incorporated methods. These examples are not intended to be exhaustive or to limit the disclosure to the precise steps and/or forms disclosed, and many modifications and variations are possible in light of the above teaching. Features described herein may be combined in any combination. Steps of a method described herein may be performed in any sequence that is physically possible.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A bushing, comprising:
   a bronze backing layer having a first axial end, a second axial end, a central opening, and flanges at said axial ends, said bushing having a cylindrical shape between said flanges;
   said bronze backing layer being a bronze alloy consisting of amounts of iron, nickel and aluminum;
   said aluminum being between about 1 and 15 percent, said iron being between about 1 and 10 percent, and said nickel being between about 3 and 10 percent;
   an impregnated layer disposed on said bronze backing layer at one of a radial inner or outer surface of said bushing, said impregnated layer having a porous bronze and an impregnated polymer in said porous bronze; and
   a topical polymer layer disposed adjacent to said impregnated layer.

2. The bushing of claim 1 wherein said topical polymer layer is indistinguishable from said impregnated layer.

3. The bushing of claim 1 wherein said flanges also include said impregnated layer and said topical polymer layer.

4. The bushing of claim 1, said topical polymer layer having a thickness of about 0.02 mm.

5. The bushing of claim 1, said impregnated layer having a thickness of about 0.25 mm.

6. The bushing of claim 1, said bronze backing layer being about 29 mils.

7. The bushing of claim 1, said bushing being a symmetrical structure.

8. The bushing of claim 1, said polymer being at least one of PTFE, polyethylene, polypropylene, poly-imide, or PEEK.

9. The bushing of claim 8, said polymer further comprising a solid lubricant.

10. The bushing of claim 9 wherein said solid lubricant is one of molybdenum-disulfide, graphite or tungsten disulfide.

11. The bushing of claim 1 wherein said bushing is defined by a first bushing portion and a second bushing portion.

12. A bushing, comprising:
    a substantially cylindrical bronze backing layer having depth between a first axial end and a second axial end, and flanges at said first and second axial ends, said backing layer having a radially inward surface and a radially outward surface;
    a porous layer of bronze disposed on one of said radially inward surface or said radially outward surface of said backing layer;
    said bronze backing layer being formed of a bronze alloy consisting of amounts of aluminum, iron and nickel;
    said aluminum being between about 1 and 15 percent, said iron being between about 1 and 10 percent and said nickel being between about 3 and 10 percent;
    an amount of PTFE impregnated into said porous layer of bronze; and
    a topical layer of PTFE disposed on said porous layer of bronze.

13. The bushing of claim 12 wherein said bronze alloy has about 10% aluminum.

14. The bushing of claim 12 wherein said bronze alloy has about 3-5% iron.

15. The bushing of claim 12 wherein said bronze alloy has about 5% nickel.

16. The bushing of claim 12, said bushing comprising a yield strength of at least 30 ksi.

17. The bushing of claim 12, said bushing comprising a yield strength of at least 50 ksi.

18. The bushing of claim 12, said bushing comprising a yield strength of at least 100 ksi.

19. The bushing of claim 12, wherein said bushing is defined by two bushing portions.

20. A bushing comprising:
    a substantially lead-free backing layer having a cylindrical shape and a radially inner surface and a radially outer surface, said backing layer formed of a bronze alloy consisting of between about 1 and 15 percent aluminum, between about 1 and 10 percent iron and between about 3 and 10 percent nickel;
    a porous bronze layer bonded to said bronze alloy backing layer;
    an impregnated polymer in said porous bronze layer on at least one of said radially inner or outer surface;
    said bronze alloy backing layer including flanges at axial ends thereof; and
    a topical layer of polymer disposed on said porous bronze layer on said at least one of said radially inner or outer surface.

21. The bushing of claim 20 wherein said flanges also having said porous bronze layer with said impregnated polymer and said topical layer of polymer.

22. The bushing of claim 20, said bushing defined by two bushing portions.

* * * * *

UNITED STATES PATENT AND TRADEMARK OFFICE
CERTIFICATE OF CORRECTION

| | | |
|---|---|---|
| PATENT NO. | : 8,850,655 B2 | Page 1 of 1 |
| APPLICATION NO. | : 13/407286 | |
| DATED | : October 7, 2014 | |
| INVENTOR(S) | : Bruce | |

It is certified that error appears in the above-identified patent and that said Letters Patent is hereby corrected as shown below:

In The Claims
In Column 6, Line 37, in Claim 20, delete "bushing" and insert -- bushing, --, therefor.

Signed and Sealed this
Sixteenth Day of February, 2016

Michelle K. Lee
*Director of the United States Patent and Trademark Office*